(12) United States Patent
Scharf et al.

(10) Patent No.: US 12,256,866 B2
(45) Date of Patent: Mar. 25, 2025

(54) HERB GRINDER WITH ENHANCED GRINDING FEATURES

(71) Applicant: Hed Technologies, LLC, Dallas, TX (US)

(72) Inventors: Eitam Scharf, Paramount, CA (US); Iftach Scharf, Rishon Lezion (IL)

(73) Assignee: The Violina Syndicate, LLC, Long Beach, CA (US)

( * ) Notice: Subject to any disclaimer, the term of this patent is extended or adjusted under 35 U.S.C. 154(b) by 118 days.

(21) Appl. No.: 17/065,407

(22) Filed: Oct. 7, 2020

(65) Prior Publication Data

US 2021/0015306 A1    Jan. 21, 2021

Related U.S. Application Data

(62) Division of application No. 16/135,923, filed on Sep. 19, 2018, now Pat. No. 10,820,755.

(51) Int. Cl.
*A47J 43/25* (2006.01)
*A47J 42/34* (2006.01)
*A47J 42/38* (2006.01)

(52) U.S. Cl.
CPC .............. *A47J 43/25* (2013.01); *A47J 42/34* (2013.01); *A47J 42/38* (2013.01); *A47J 43/255* (2013.01)

(58) Field of Classification Search
CPC .......... A47J 43/25; A47J 43/255; A47J 42/34; A47J 42/38
See application file for complete search history.

(56) References Cited

U.S. PATENT DOCUMENTS

| | | |
|---|---|---|
| 117,924 A | 8/1871 | Peiece |
| 165,143 A | 6/1875 | Ee |
| 268,511 A | 12/1882 | MoCobb |
| 307,180 A | 10/1884 | Eichaed |
| 337,619 A | 3/1886 | Salmon |
| 463,823 A | 11/1891 | Beach |
| 307,228 A | 12/1905 | Casimir |
| 817,298 A * | 4/1906 | Byers et al. ............ A47J 43/25 241/84.4 |
| 931,828 A | 8/1909 | Thomas |
| 933,507 A | 9/1909 | Weber |
| 1,000,628 A | 8/1911 | Ryther |
| 1,410,008 A | 3/1922 | Gale et al. |
| 1,611,244 A | 12/1926 | Schmidt |
| 1,624,032 A | 4/1927 | Andrews |
| 1,845,522 A | 2/1932 | Rowley |
| 1,915,869 A | 6/1933 | Rowley |
| 2,110,799 A | 3/1938 | Henschell |
| 2,154,650 A | 4/1939 | Wishinsky |
| 2,204,057 A | 6/1940 | Swartz |
| 2,225,658 A | 12/1940 | Rauchfuss |
| 2,252,859 A | 8/1941 | Murdock |

(Continued)

FOREIGN PATENT DOCUMENTS

IL    256287 A * 3/2019 ............. A24F 15/18

*Primary Examiner* — Faye Francis
(74) *Attorney, Agent, or Firm* — Fulwider Patton LLP

(57) ABSTRACT

A grinder specially adapted for grinding herbs has a sheet with unique groove and hole patterns forming a grinding area. Although it is a manual grinder, the grinder does not require the use of cutting blades, making it much safer to use. The grinder is particularly suitable for grinding softer herbs.

6 Claims, 15 Drawing Sheets

(56) References Cited

U.S. PATENT DOCUMENTS

| | | |
|---|---|---|
| 2,405,056 A | 7/1946 | Rosenbloom |
| 2,500,560 A | 3/1950 | Morris |
| 2,585,881 A | 2/1952 | Walker |
| D167,270 S | 7/1952 | Marcus |
| 3,045,321 A | 7/1962 | McDermott |
| 3,121,450 A | 2/1964 | Cronheim |
| 3,604,490 A * | 9/1971 | Bricker .................. B26D 1/29 241/273.3 |
| 3,858,815 A | 1/1975 | Black |
| 4,037,793 A | 7/1977 | Puustinen |
| 4,240,806 A | 12/1980 | Frantzen |
| 4,272,612 A | 6/1981 | Oliver |
| 4,749,135 A | 6/1988 | Walsh |
| 4,790,488 A * | 12/1988 | Borner .................. A47J 43/25 241/168 |
| 4,874,136 A | 10/1989 | Webster |
| 5,100,506 A | 3/1992 | Sturtevant et al. |
| D347,979 S | 6/1994 | Feer et al. |
| 5,328,026 A | 7/1994 | Newman |
| 5,711,491 A | 1/1998 | Molo |
| 6,082,645 A | 7/2000 | Himmighofen et al. |
| D447,022 S | 8/2001 | Wong |
| D447,391 S | 9/2001 | Bodum |
| 6,318,652 B1 | 11/2001 | Liu |
| 6,402,067 B1 | 6/2002 | Webster |
| 6,467,709 B1 | 10/2002 | Hattori |
| D474,378 S | 5/2003 | Brandenburg |
| D480,613 S | 10/2003 | Wong |
| 6,860,441 B2 | 3/2005 | Richardson |
| 6,883,697 B1 | 4/2005 | Chi Kuo |
| D669,746 S | 10/2012 | Scharf et al. |
| D669,747 S | 10/2012 | Scharf et al. |
| 8,381,640 B1 | 2/2013 | Wilson |
| 8,636,237 B2 | 1/2014 | Scharf et al. |
| 8,672,249 B2 | 3/2014 | Scharf et al. |
| 8,882,010 B2 | 11/2014 | Scharf et al. |
| 10,661,281 B2 | 5/2020 | Kaplan |
| 10,820,755 B2 | 11/2020 | Scharf et al. |
| 2003/0222162 A1 | 12/2003 | Klamer |
| 2005/0061697 A1 | 3/2005 | Moberg |
| 2005/0082188 A1 | 4/2005 | Reaux |
| 2005/0145733 A1* | 7/2005 | Silver .................. A47J 43/25 241/168 |
| 2007/0029424 A1 | 2/2007 | Gorton-Hulgerth et al. |
| 2007/0251100 A1 | 11/2007 | Fisk |
| 2009/0193662 A1 | 8/2009 | van Deursen |
| 2010/0242745 A1 | 9/2010 | Smith et al. |
| 2011/0017853 A1 | 1/2011 | Smith et al. |
| 2011/0031145 A1 | 2/2011 | Larson et al. |
| 2012/0187231 A1 | 7/2012 | Scharf et al. |
| 2014/0144796 A1 | 5/2014 | Ziemba |
| 2015/0165616 A1 | 6/2015 | Chern |
| 2015/0272396 A1* | 10/2015 | Smith .................. A47J 43/25 241/95 |
| 2017/0020342 A1* | 1/2017 | Wein .................. A47J 43/255 |
| 2019/0174958 A1* | 6/2019 | Guetta .................. A47J 42/34 |

\* cited by examiner

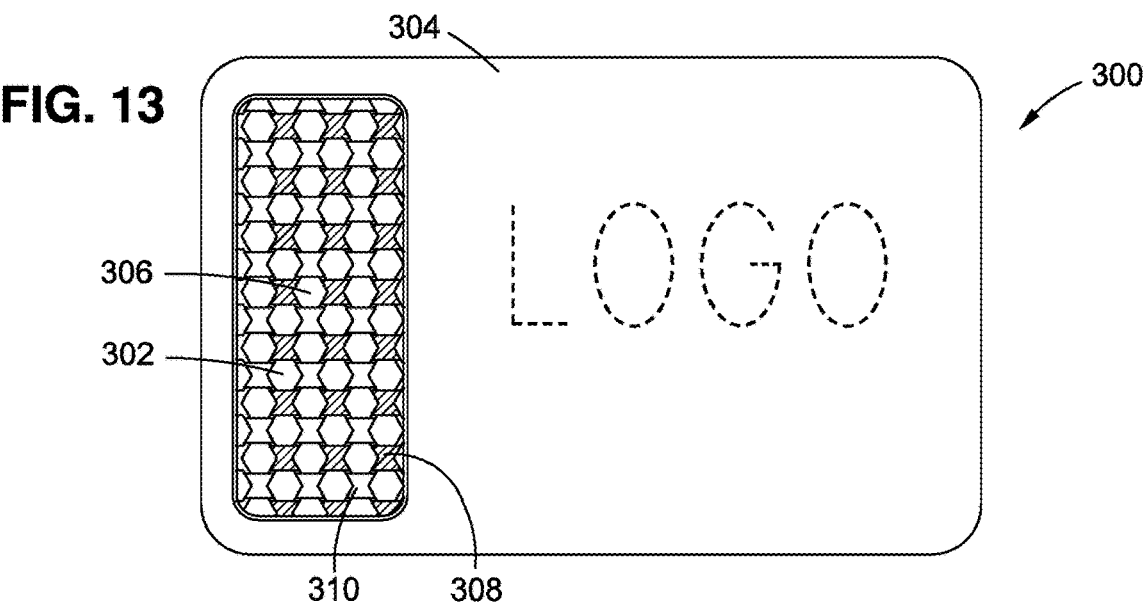
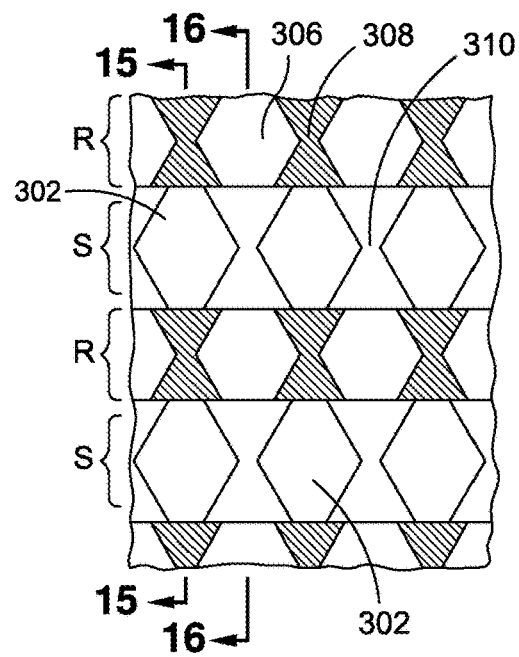
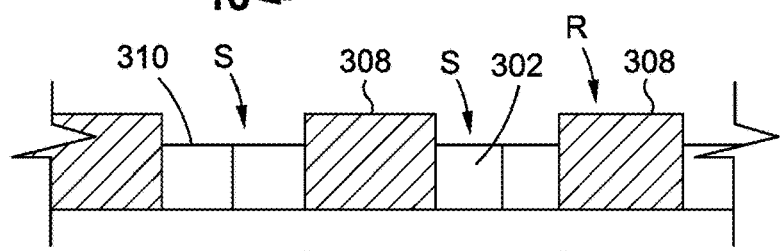
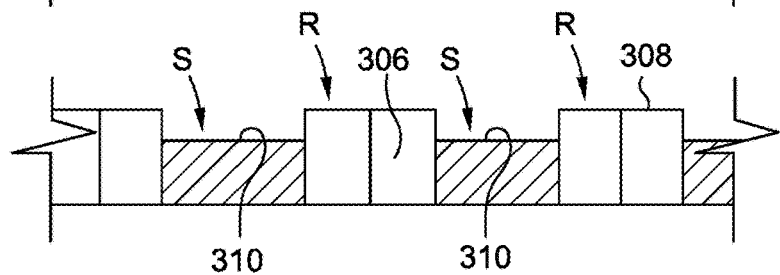

HERB GRINDER WITH ENHANCED GRINDING FEATURES

RELATED APPLICATIONS

This application is a division of application Ser. No. 16/135,923, filed Sep. 19, 2018, the contents of which are incorporated herein by reference in their entirety.

BACKGROUND

The present invention relates generally to grinders, and more particularly has reference to a grinder specifically designed for grinding herbs.

There are three types of grinders. One is the electric grinder, which is motor-driven and cuts and grinds in rotation. Although efficient, it is usually large and not easy to carry. It also needs to be self-powered or requires connection to an external power source. The second type of grinder is a manual grinder. These types of grinders are smaller often with many cutting blades, and the user needs to hold both the grinder and the material being ground while grinding. The sharp cutting blades, and the need for the user to grind the material back and forth manually, can pose a safety hazard and may be dangerous to the user. A third type of grinder—also manual—is the rotary grinder. This type of grinder does not require the user to hold both the grinder and the material being ground. Instead, the user places the material inside the grinder, closes the two parts of the grinder, then twists. The problem with these types of grinders is that they are bulky to carry, do not allow a user to grind herbs directly over food or a container, offer only one grinding consistency, and are hard to clean.

Some herbs require very delicate handling when being ground to mulch or particulate form because they may be damaged if overheated or may suffer destruction of natural oil structures if ground too aggressively or energetically. There is a need for a herb grinder that allows a user to reduce a delicate natural herb to a small quantity of ground mulch or particulates by applying a minimal amount of energy to the herb during grinding, so that overheating and destruction of oils do not result. There is a further need for a portable manual herb grinder that is easy to carry and that reduces the tendency of the grinder to injure a user in the final stages of a grinding operation. The present invention addresses these and other needs.

SUMMARY OF THE INVENTION

Briefly, in general terms, the present invention relates to a new type of grinder for grinding herbs embodying a sheet with novel groove and hole patterns forming a grinding area.

The grooves can have a variety of different configurations and shapes including rectangles, squares, circles, ovals, hearts, and other polygonal shapes in aligned or staggered arrangements. The grooves also may be configured as rings, and may feature a plurality of rings concentrically arranged at specific radial intervals.

The angle between the side wall of the grooves and the adjacent surface of the sheet can be perpendicular as well as acute or obtuse, an may be selected for optimum desired performance.

The sheet can be made of plastic, metal, wood or glass. The surface of the sheet can be coated with a non-stick material. The sheet may be either flat or curved.

The grinder can have one or multiple groups of grinding areas.

The sheet can be provided with a plurality of through holes which are distributed in the grooves and/or on the surface of the sheet.

When a herb grinder made in accordance with the present invention is used as a manual grinder, it is safer to use because it does not require cutting blades on the surface that could cut the user's fingers during use. The grinding area is provided by the features embedded within the special sheet rather than on the surface of the sheet, which provides safety when grinding.

A grinder made in accordance with the present invention is particularly suited for use in grinding soft herbs, spices, fruits, nuts, and tobacco, etc. The grinder is easy to carry, and can easily fit in a briefcase, business card holder, or even a wallet. The user can carry it in a book. In a preferred form, the grinder is about the size of a credit card. Its shape can be rectangular, round, oval, or other regular or irregular polygonal shapes.

These and other features and advantages of the invention will become more apparent from the following detailed description, taken in conjunction with the accompanying drawings, which illustrate, by way of example, the features of the invention.

BRIEF DESCRIPTION OF THE DRAWINGS

FIG. 13 is a plan view of still another embodiment of the invention.

FIG. 14 is a detail view of a fragmentary portion of FIG. 13.

FIG. 15 is a sectional view taken substantially along the line 15-15 in FIG. 14.

FIG. 16 is a sectional view taken substantially along the line 16-16 in FIG. 14.

DETAILED DESCRIPTION OF THE PREFERRED EMBODIMENTS

Figure 1A:
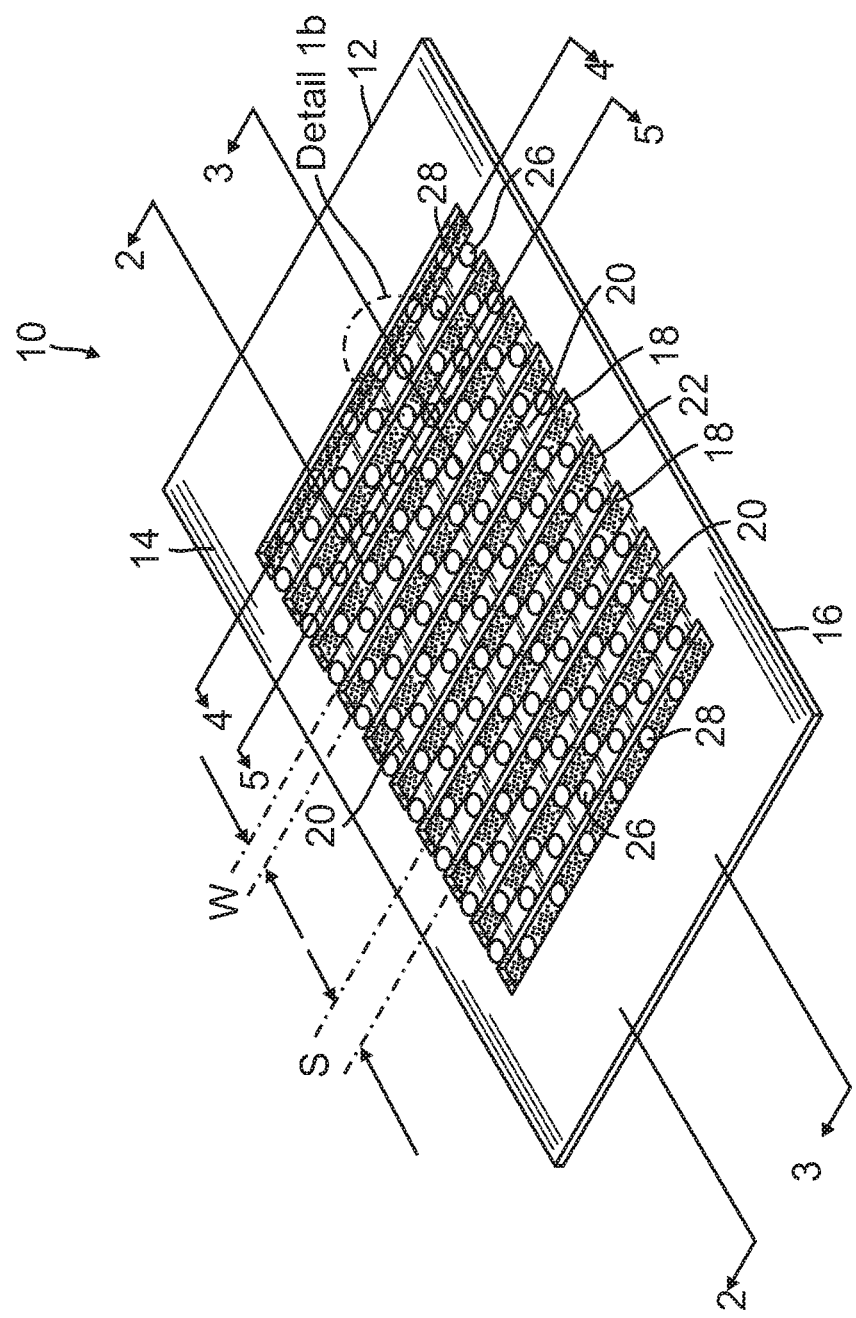
FIG. 1A is a perspective view of a herb grinder having features of the present invention.

Referring now to the drawings, there is shown a herb grinder 10 that includes features of the present invention. The structure of the preferred embodiment will be first described, followed by preferred methods of manufacturing the same.

In a first aspect of the herb grinder 10, and with reference to FIG. 1, the herb grinder 10 comprises a thin metal sheet 12, preferably formed from stainless steel. In this embodiment, the metal sheet is preferably between 0.1 mm and 5.0 mm thick having a top surface 14 and a bottom surface 16. Preferably, the sheet 12 is about 4 cm to 6 cm in width, and about 8 cm to 10 cm in length, approximately the size of a typical credit card.

The sheet 12 has a series of similarly shaped parallel linear grooves 18 formed at least in the top surface 14 of the sheet. The size and shape of the grooves can vary, and are selected with the primary preferred objective that a user's finger, drawn across the upper surface 14 of the grinder, will not penetrate a groove to reach the floor of a groove 18. Thus, preferably, the grooves 18 have a width "w" which is one half the dimension of the center spacing "s" between the grooves. In a preferred embodiment the width "w" of the grooves is between 0.6 mm and 5.0 mm, and the center spacing "s" of the grooves is between 1.2 mm and 10.0 mm. In this embodiment, the depth "d" of the grooves is preferably between 0.025 mm and 0.3 mm deep.

Figure 1B:
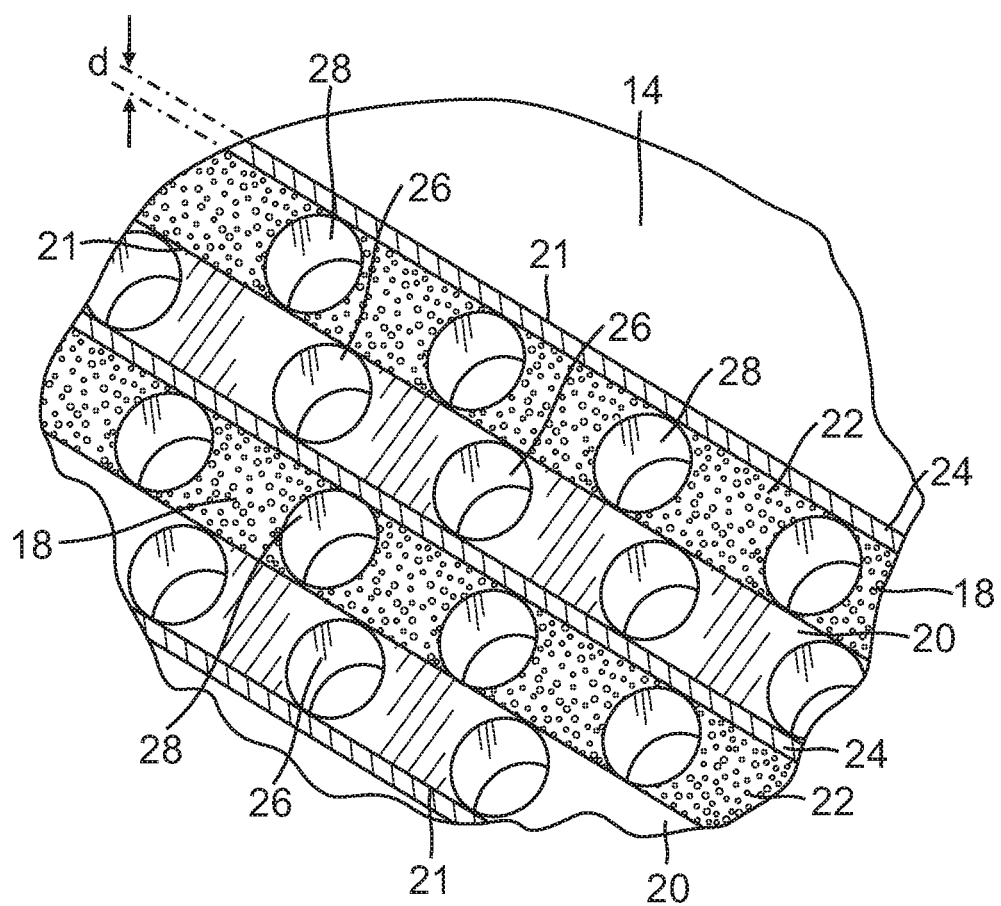
FIG. 1B is a detail view of a portion of FIG. 1A that is identified therein as "Detail 1B."
Figure 2:
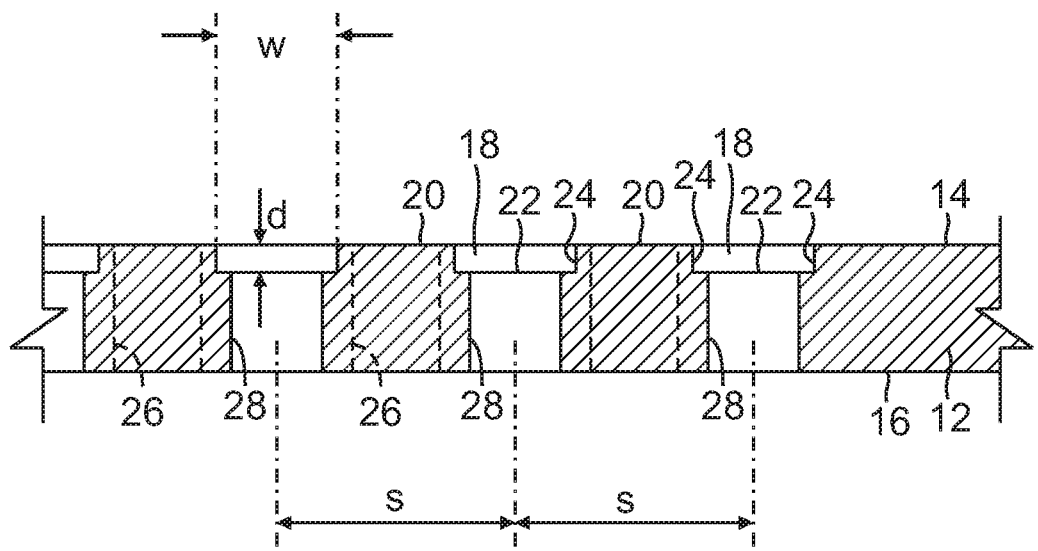
FIG. 2 is sectional view of the herb grinder of FIG. 1 taken substantially through line 2-2 in FIG. 1.
Figure 3:
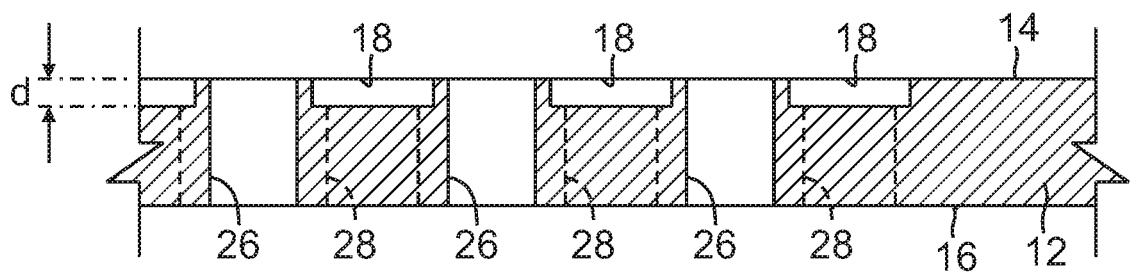
FIG. 3 is sectional view of the herb grinder of FIG. 1 taken substantially through line 3-3 in FIG. 1.
Figure 4:
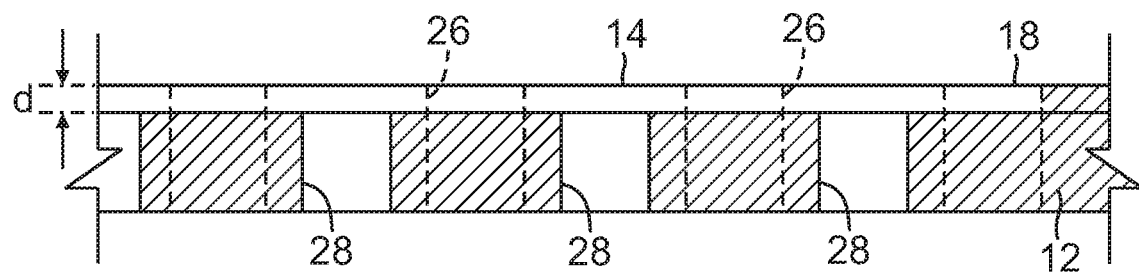
FIG. 4 is a sectional view of the herb grinder of FIG. 1 taken substantially through line 4-4 in FIG. 1.
Figure 5:
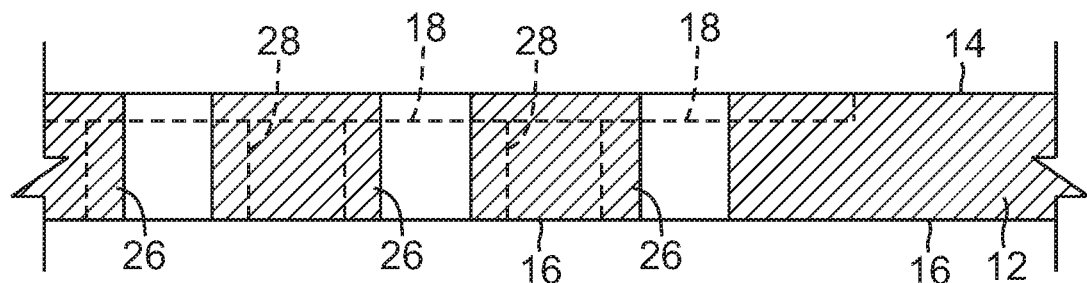
FIG. 5 is a sectional view of the herb grinder of FIG. 1 taken substantially through line 5-5 in FIG. 1.

In accordance with the structure described, four sectional views are shown and described in FIGS. 2-5. A first sectional view taken through the sheet and extending perpendicular to the grooves substantially along line 2-2 of FIG. 1 is shown in FIG. 2, which shows in cross section a series of horizontal steps in the form of a square wave extending along the upper surface of the sheet. Each wave's wavelength "s" has an upper surface 20 facing upwards, which may also referred to herein as a peak or cap. In a preferred embodiment, the upper surface may be formed, effectively, by the unaltered top surface 14 of the sheet 12. Each wave also has a lower surface 22 facing upwards that is lower than the upper surface 20. The lower surface may also be referred to herein as a valley or valley floor. Each upper surface 20 of a wave is connected to each lower surface 22 by a vertical surface, or wall, 24 present in each groove 18, so that the wave is in effect a continuous square wave shaped surface formed on the sheet, as exemplified in FIGS. 2-3.

In a third aspect, the preferred herb grinder 10 includes a plurality of holes extending through the sheet 12. Preferably, the holes are circular in profile, but may be square, diamond, elliptical, star, pentagon, or triangular and the like in alternative embodiments. All the holes preferably have the same diameter or size and include two types of hole as described below.

A plurality of a first type of hole, each shown marked with the numeral 26, are formed in the sheet so that each first type hole 26 is spaced laterally apart from an adjacent first type hole along the length of an upper surface 20 of a wave as exemplified in FIG. 1A. Each first type hole 26 extends from the upper surface 20 of the wave to the bottom surface 16 of the sheet, as seen in FIGS. 2-5. The size of and spacing between the holes can vary, depending on the desired particulate size of the ground herb. Preferably, the holes of the first type 26 are spaced apart from each other by a distance of between 0.5 mm and 2.5 mm. Further, the diameter of each hole of the first type is preferably sized to fit comfortably within the space created on the upper surface 20, as seen in FIG. 1A. Preferably, the holes have a diameter of between 0.6 mm and 5.0 mm, with a typical size of about 1.8 mm. A larger hole can be used when a more chunky ground herb is desired. A smaller hole can be used to produce a finer ground herb.

A set of holes of a second type, marked generally with the numeral 28, is formed in the sheet so that each hole of the second type 28 is spaced apart from an adjacent second type hole, and each second type hole is positioned along the length of a lower surface 22 of the wave within a groove 18 and extends from the lower surface 22 of the wave to the bottom surface 16 of the sheet, as seen in FIGS. 2-5. Under this configuration, a plurality of lower surfaces 22 may include second type holes 26. The size of and spacing between the holes can vary, as desired. Preferably, the holes of the second type are spaced apart from each other by a distance of between 1.5 mm and 2.5 mm. Further, the diameter or size of each hole of the second type is preferably sized to fit precisely within the width "w" of the lower surface 22, as seen in FIG. 1A.

All of the holes of the first and second type can be made the same size for uniform grinding. Alternatively, holes of different sizes can be used in different regions to produce different grinding surfaces in different areas of the grinder.

As previously noted, the grinder of the present invention does not have cutting blades that could easily cut a user's fingers. Instead, the grooved sheet structure forms the grinding area. The sidewalls of the grooves provide a grinding action. The user's fingers are protected because those walls are not on the surface of the sheet.

There are many ways of forming the holes and grooves in the foregoing embodiment. For example, the grooves can be formed using a CNC machine, mold stamping, laser cutting, or water jetting to process the sheets. Another option is to use mask chemical corrosion or photochemical etching which when processing, causes the bottom of the grooves to be corroded and rough, which can enhance the grinding efficiency. The surface of the sheet itself also can be either smooth or rough, as desired. The holes can be formed by stamping or punching or by any other suitable means, and they can be formed in the sheet before or after the grooves have been formed.

While not required, one advantage of using photochemical etching to form the wave pattern comprising the grooves 18 and holes 26, 28 in the metallic sheet 12, is that each upward facing lower surface 22 of the wave pattern (i.e. the floor of each groove 18) is given a rough crystalline surface texture that is found to form from stainless steel during chemical erosion. Such a crystalline surface provides an abrasive surface for gently abrading a herb or other organic matter as described more fully below. As a further inherent result of the chemical erosion process, the edges 21 (See FIG. 1*b*) of the upper surfaces 20 at the point of intersection between the upper surface 20 and the vertical wall 24, and the edges of the holes 26 and 28, are somewhat rounded, and do not present a sharp edge capable of injuring the tips of a user's fingers, such as might be the case if the grooves were mechanically cut into the metal sheet 10. Furthermore, in a preferred embodiment, the upper surface 20 of each square wave is not chemically etched, thus leaving the upper surface 20 of each square wave in its original smooth configuration as part of the upper surface 14 of the original metal sheet. This preferred aspect imparts the advantage that the abrasive surfaces 18 on the floor of each groove are set below the upper surface 14 of the grinder. Thus, a user who inadvertently allows his fingers to pass rapidly over the grinder does not abrade or injure the tips of his fingers because the size, depth, and spacing of the grooves are selected such that a finger passing rapidly over the upper surface 14 of the grinder will not pass through a groove to reach the abrasive bottom surface 18 of the groove, and the upper surface 20 is without an abrasive surface. This optional feature, and the credit card size of the preferred embodiment, also makes the grinder easy to carry in a pocket or a wallet or a similar type of small flat case used for carrying personal items.

A herb grinder 10 optionally made by chemical etching provides advantageous features for grinding a herb to a fine mulch or particulate form without requiring or imparting excessive energy or heating. A herb is ground by rubbing a dried sprig of herb along the sheet 12, perpendicular to the direction of the grooves 18 so that the sprig is dragged across a plurality of grooves. The depth of the grooves is selected so that, as the sprig passes over each groove, a portion of the sprig is biased by the user to enter into the groove to be dragged over the crystalline lower surface 22 of each groove 18. Passing the sprig over the crystalline lower surface 22 produces a first micro-abrasive action which pulverizes the tip of the sprig in contact with the crystalline surface. Then, when the sprig has passed over the lower surface 22, it is knocked into one of the vertical walls 24 of the groove 18. This knocking effect produces a second, macro-abrasive action. Ultimately, after the ground herb has been knocked off the sprig, the ground herb falls through either a first type hole 26 or a second type hole 28 onto a paper or collection sheet situated under the grinder that is suitable for collecting the herb without tainting or affecting its qualities. Any large or undesired stems or seeds that break off during grinding are separated from the mulch and remain on the upper surfaces of the grinder where they can be brushed away. Furthermore, as noted above, the preferred configuration of the grinder is such that a user who inadvertently allows his fingers to pass over the upper surface 14 of the grinder will likely not suffer injury to his fingers because the abrasive surface of the grinder is located at the bottom of the grooves where a finger is too large to penetrate, and the upper edges of the grooves and holes are sufficiently rounded by the etching process to avoid injury. The dual abrasive action provides an advantageous structure for finely grinding delicate herbs and collecting the powdered proceeds without overheating or degrading the herb.

Additional and/or alternative structural features of the invention are illustrated and described with reference to FIGS. 6-15. The same methods of manufacture as described above may be used.

Figure 6:
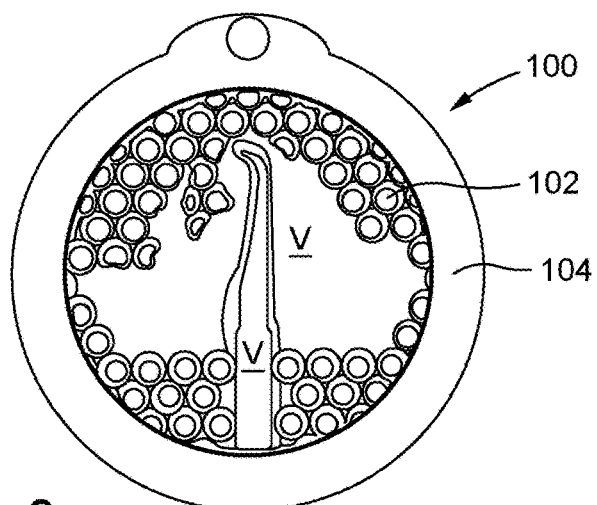
FIG. 6 is a plan view of a further embodiment of the invention.

FIG. 6 shows a plan view of a herb grinder 100, similarly constructed from a thin metal plate 104. This embodiment, seen in FIGS. 6-9, includes a series of holes 102 that are aligned in relation to each other to form rows. The rows may simultaneously extend diagonally from upper left to bottom right and also from bottom left to upper right. A useful feature of the holes 102 is that the radius R1 of each hole on the upper surface 103 of the plate is larger than the radius R2 on the lower surface 105 of the plate. In preferred embodiments, R1 may be in the range of up to 3.0 mm and R2 may be in the range of up to 2.99 mm. It will be appreciated that this configuration provides a conical shape defined by the surface 107 on the inside of the holes. While not required, the holes may be formed by the chemical etching process, to provide roughed conical surfaces. In further preferred embodiments, the conical surface may be given a slight curvature having radius Q, as shown in FIGS. 8 and 9. The advantage of this feature is that it helps with condensing the herb passing through the holes prior to disposal, while keeping it easy to grind by maintaining a large upper entry hole. It also saves on production costs as less material needs to be carved out.

Figure 7:
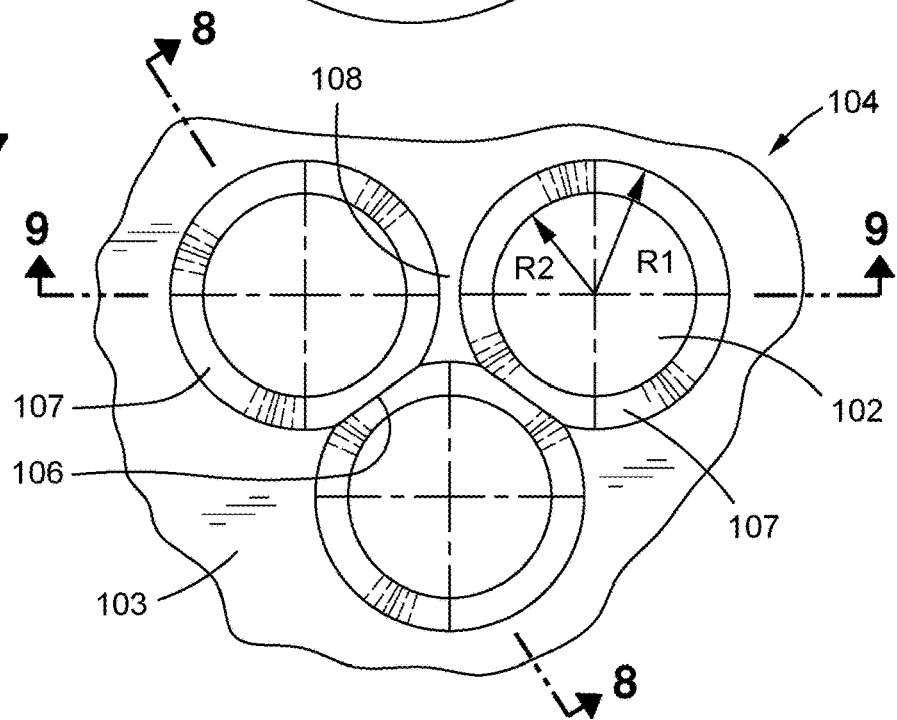
FIG. 7 is a detail view of a fragmentary portion of FIG. 6.
Figure 8:
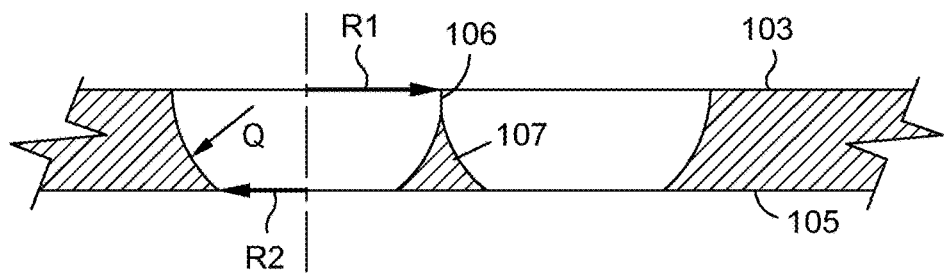
FIG. 8 is a sectional view taken substantially along the line 8-8 in FIG. 7.
Figure 9:
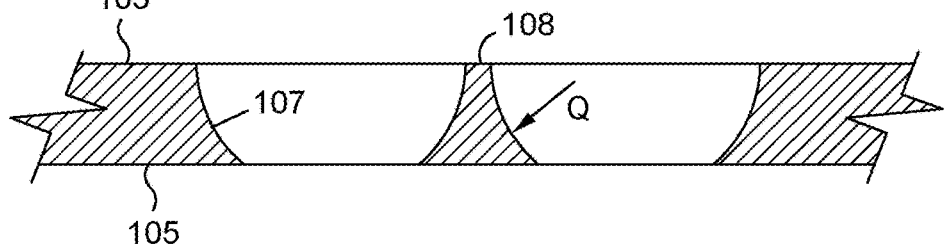
FIG. 9 is a sectional view taken substantially along the line 9-9 in FIG. 7.

A further aspect of this particular embodiment is that the upper surface of the plate can be narrowed significantly and/or reduced in height in the regions between holes 102 along the same diagonal row, as best shown at 106 in FIGS. 7 and 8, while the upper surface may be left intact between laterally adjacent holes, as best shown at 108 in FIGS. 7 and 9. The advantage of this feature is that the narrowed or reduced height regions create a sharper point of contact with the herb being ground, which can assist in breaking up more condensed types of herbs and foods. The narrowed or reduced height regions can be formed by over-etching the holes during formation.

Figure 10:
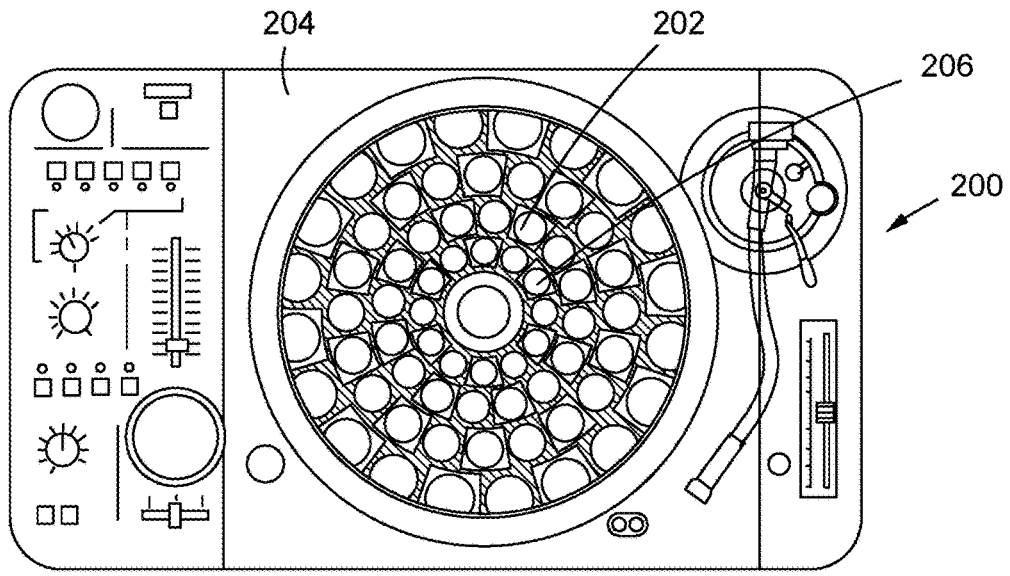
FIG. 10 is a plan view of yet another embodiment of the invention.
Figure 11:
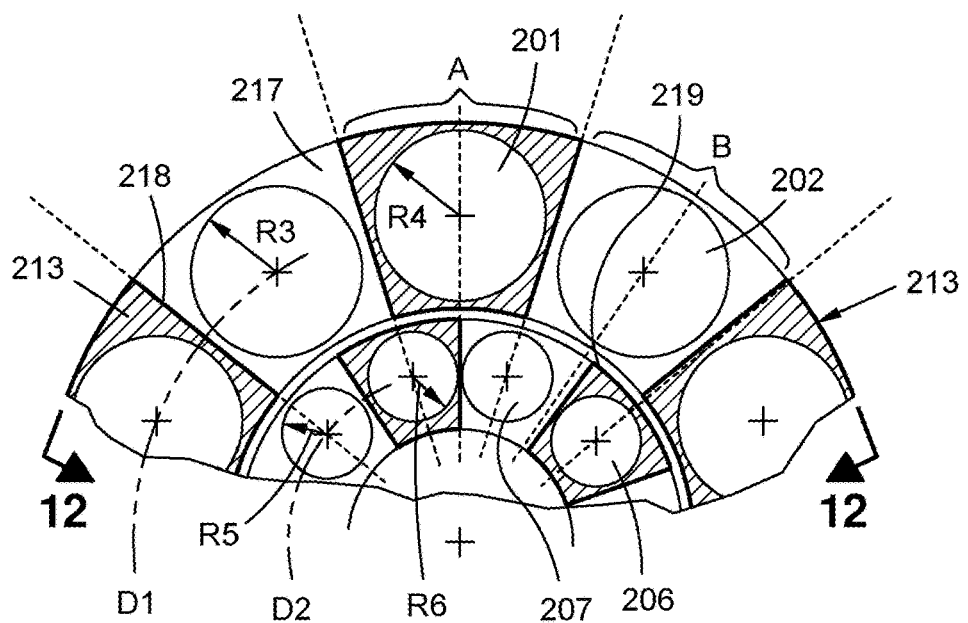
FIG. 11 is a detail view of a fragmentary portion of FIG. 10.
Figure 12:
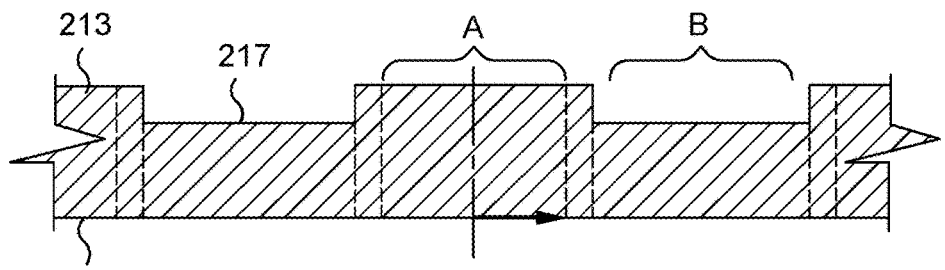
FIG. 12 is a sectional view taken substantially along the line 12-12 in FIG. 11.

FIGS. 10-12 show a further embodiment 200 of the invention. FIG. 10 shows a plan view of this embodiment. In this embodiment, a plurality of holes are distributed about a central point in the middle of a circular distribution, as shown in FIG. 10. Around a first circumference D1, a series of holes 201 and 202 are distributed, adjacent each other. Around a second circumference D2, smaller than D1, a series of smaller holes 206 and 207 are distributed, adjacent each other. The outer holes 201 and 202 can be radially aligned with the inner holes 206 and 207, or they can be offset as shown in FIG. 11. Hole type 201 is distinguished by the fact that it is cut through the metal plate 204 from the upper surface 213 of the plate through to the lower surface 215 of the plate. Hole type 202 is distinguished by the fact that an area around the hole 202 is first etched, to provide an intermediate surface 217 that is lower than the upper surface 213 of the plate. See FIG. 12. Then, hole 203 is cut between the intermediate surface 217 and the lower surface 215. The etched area around the hole 202 can be given any shape, but preferably is provided with a rectangular or trapezoidal shape as shown in FIGS. 10 and 11, and has a roughened upper surface.

A similar arrangement may be provided for the holes 206 and 207 which are distributed around the circumference D2. Holes of type 206 are cut from the upper surface 213 to the lower surface 215, while holes of type 208 are cut from the intermediate surface 217 to the lower surface 215. The advantage of this feature is that it provides additional edges 218 and corners 219 around each hole 201, 202, 206 and 207 which act as grinding surfaces to enhance the grinding action regardless of the direction in which the herb is moved across the upper surface 213 of the plate 204.

FIGS. 13-16 show yet a further embodiment 300 of the invention. Here, holes are formed in a thin metal plate 304 in a series of parallel rows that run horizontally across the upper surface of the plate, with the holes in adjacent rows being laterally offset from each other to form diagonals running from upper left to lower right, and from lower left to upper right, as best shown in FIG. 13. With reference to FIGS. 14-16, a first groove "S" running horizontally is cut to encompass a first row of adjacent holes 302. Then a space is left to form a cap "R" of similar width to that of groove "S" encompassing an adjacent row of holes—followed by another groove "S" and so on. This arrangement produces a row of holes 306 on the cap which are separated by discrete elevated bridges 308 of generally hourglass shape, and a row of holes 302 which lie in the groove "S" separated by a number of reduced platforms 310 also having a generally hourglass shape. While not required, the grooves may be preferably formed by chemical etching to provide a roughened surface at the bottom of the groove.

The holes in the embodiment shown in FIGS. 13-16 are hexagonal in shape, but they can be other shapes as well including rectangular or circular.

Figure 17:
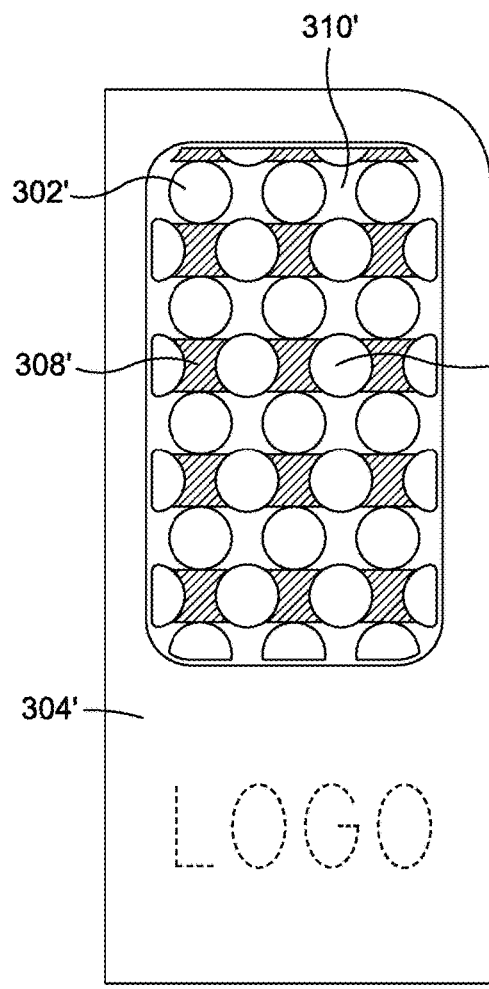
FIG. 17 is a plan view of an alternative embodiment of the invention, which is similar to the embodiment shown in FIGS. 13-16, but with circular holes instead of hexagonal holes.
Figure 18:
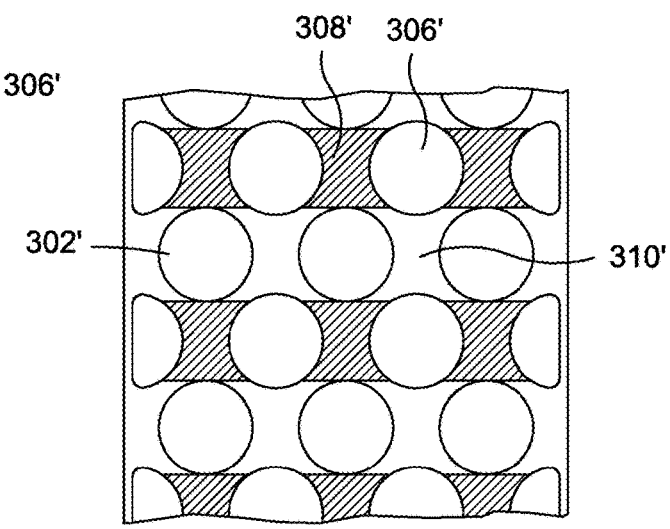
FIG. 18 is an enlarged detail view of a fragmentary portion of FIG. 17.
Figure 19:
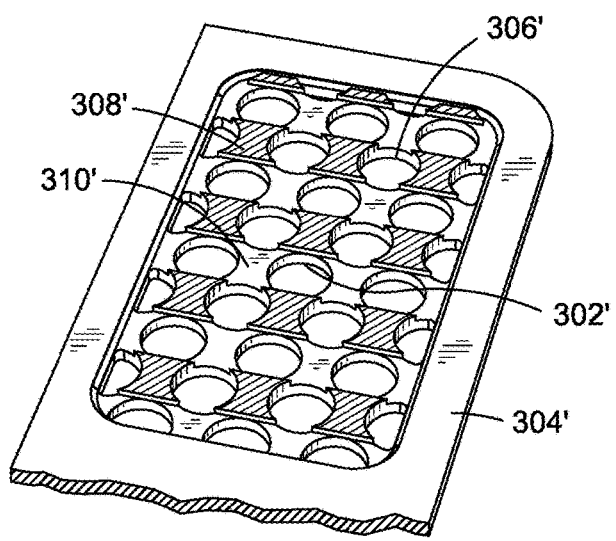
FIG. 19 is a perspective view of a fragmentary portion of FIG. 17.

By way of example, FIGS. 17-19 show an embodiment 300' which is similar to the embodiment of FIGS. 13-16, but with circular holes 302' and 306' instead of hexagonal holes. Once again, adjacent bridges 308' in the caps are not connected to each other. An advantage of this feature, as best shown in FIG. 19, is that the holes 306' in the caps are not fully enclosed by the bridges 308' but are at least partly open to the grooves, i.e., there are no vertical walls or barriers rising up from the platforms 310' fully separating the holes 306' from the grooves. In other words, each hole 306' has a periphery which is at least partly open to the adjacent grooves so that the interior of the hole is in communication with the grooves. This helps direct the ground herb to the holes 306' without sticking on walls.

Other variations on the embodiments show in FIGS. 13-19 are also possible. For example, the grooves can be arranged to run diagonally from upper left to lower right and upper right to lower left, with each groove encompassing a diagonal row of holes. This will result in elevated bridges between each of the holes in each horizontal row. Likewise, the bridges can be other shapes including rectangular or circular. In addition, the holes in each row can be the same size or different sizes.

Referring again to the herb grinder 10 shown in FIGS. 1A and 1B, various additional modifications are possible. Among other things, the grooves can have a variety of different configurations and shapes including rectangles, squares, circles, ovals, hearts, and other polygonal shapes in aligned or staggered arrangements. The grooves also may be configured as rings, and may feature a plurality of rings concentrically arranged at specific radial intervals. The angle between the side wall of the grooves and the adjacent surface of the sheet can be perpendicular as well as acute or obtuse, and may be selected for optimum desired performance. The sheet can be made of plastic, metal, wood, or glass. The surface of the sheet can be coated with a non-stick material. The sheet may be either flat or curved. The grinder can have one or multiple groups of grinding areas. Examples of these alternative configurations are illustrated and described below.

Figure 20:
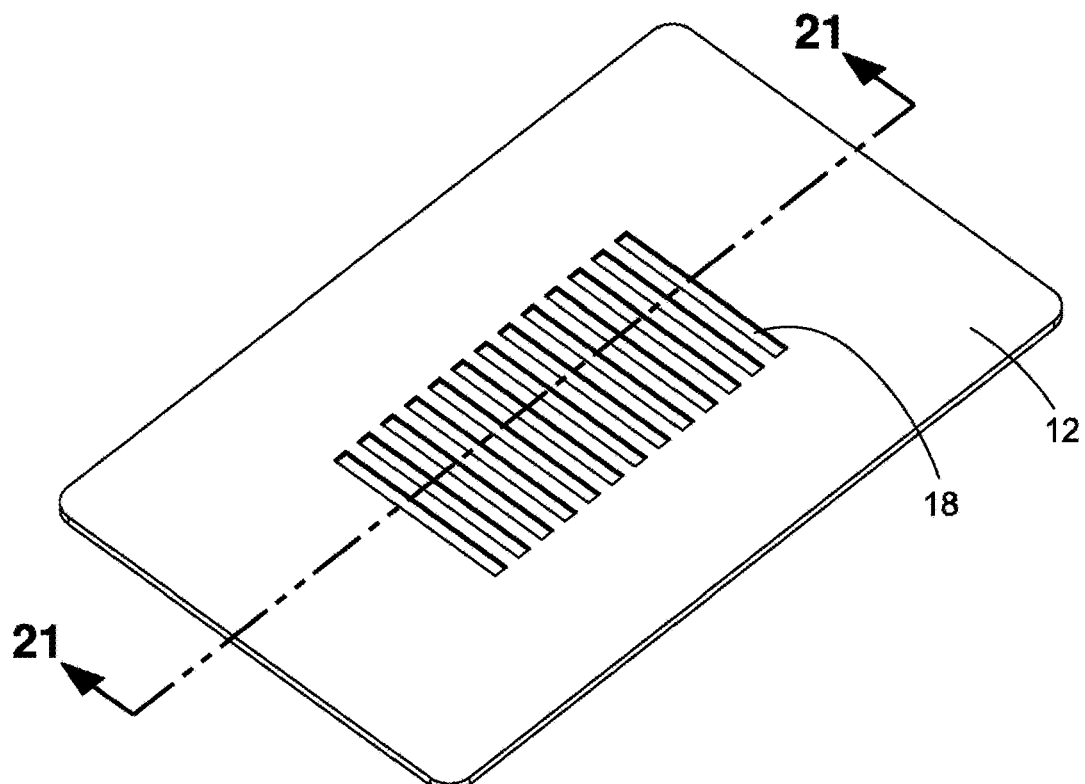
FIG. 20 is a perspective view of another embodiment of the invention, which is similar to the embodiment shown in FIGS. 1A and 1B but without the through holes.
Figure 21:
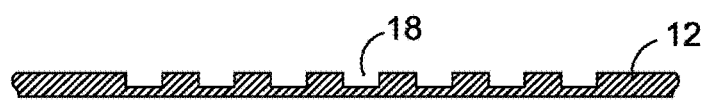
FIG. 21 is a sectional view taken substantially along the line 21-21 of FIG. 17.

The alternative grinder shown in FIGS. 20 and 21 is particularly suitable for grinding softer herbs, spices, fruits, nuts, and tobacco, etc. The grinding and cutting occurs as a result of reciprocal two-way movement of the material to be ground across the surface of the sheet. This makes the grinder very efficient to use. It is also easy to carry. In a preferred form, the grinder is the size of a credit card, and can easily fit in a briefcase, business card holder or wallet. It can also be put in a book or notebook, and even in a pocket.

Figure 22:
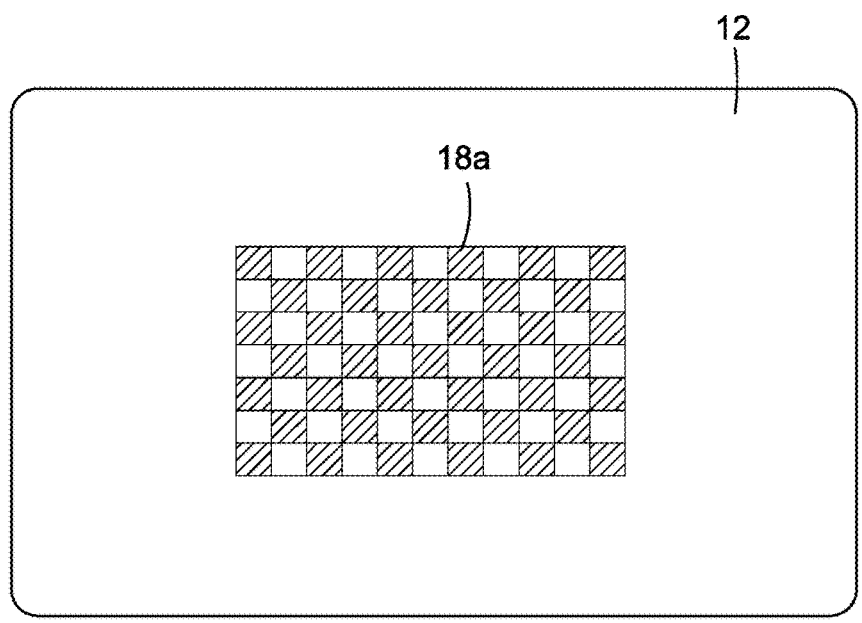
FIG. 22 is a plan view of another embodiment of the invention.

FIG. 22 shows another alternative embodiment of the grinder in which each of the grooves 18a has a square shape, and the grooves are neatly arranged into rows and columns of alternating grooves and square spaces forming a checkerboard pattern within the grinding space. In order to better illustrate the difference between the grooves and the adjacent surface of the sheet in the spaces between the grooves, the grooves have been illustrated with a hatching pattern in FIG. 22 (and in subsequent Figs.) to distinguish between the grooves and the adjacent spaces. Compared with the embodiment shown in FIGS. 20 and 21, the grinding resistance of the embodiment shown in FIG. 22 is less, which results in a smoother and more delicate grind.

Figure 23:
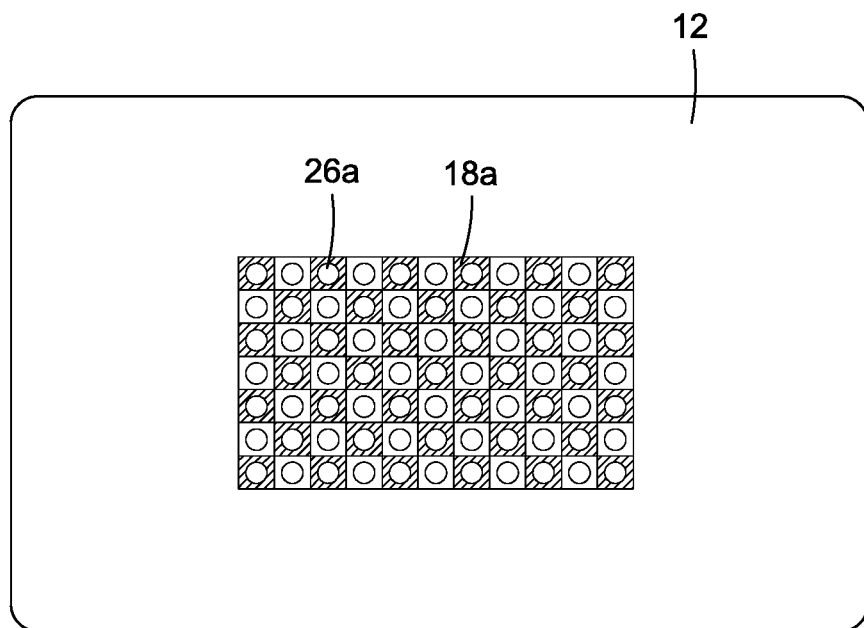
FIG. 23 is a plan view of yet another embodiment of the invention.

The alternative embodiment shown in FIG. 23 is similar to the embodiment shown in FIG. 22, except that there are through holes 26a provided in the grooves 18a and on the adjacent surface of the sheet 12 in the spaces between the grooves. The holes extend completely through the sheet. The holes perform an additional grinding and cutting function. They add additional cutting edges to the grinder, making it even more efficient than the previous embodiment. The holes also have the added feature of eliminating waste bits from the grooves and the adjacent surfaces of the grinder, thereby preventing waste accumulation that could adversely affect the grinding.

Figure 24:
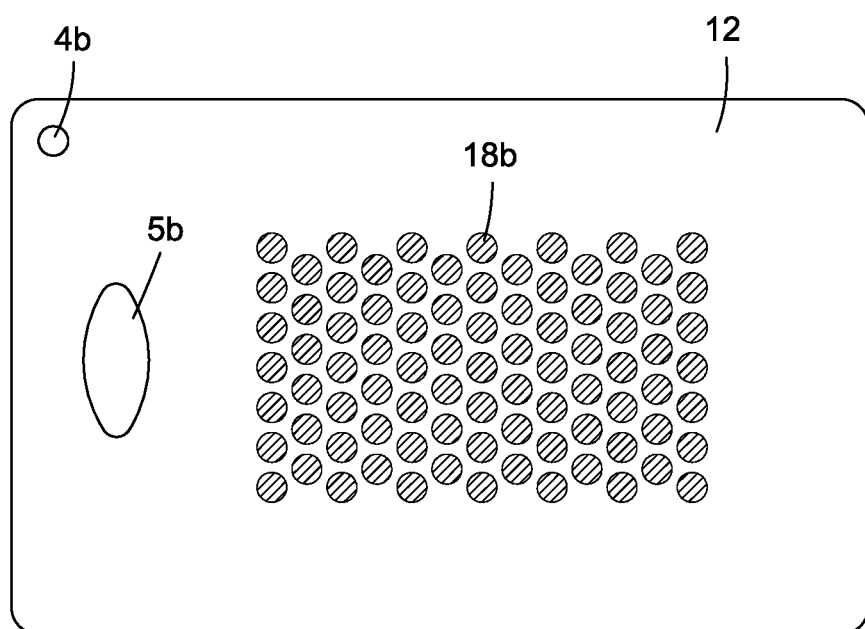
FIG. 24 is a plan view of still another embodiment of the invention.

In the alternative embodiment shown in FIG. 24, the difference is that the grooves 18b have a circular shape. There are spaces between the grooves, and these circular grooves form the grinding area.

In addition, in order to make the grinder more convenient, a hanging hole 4b is provided on the corner of the sheet 12. The hole can be used to hang the grinder on a keychain so that it can be carried around easily by the user. In addition, the grinder also has been provided with a bottle opener 5b in the form of a large oval opening near the edge of the sheet 12. The many possible functions of the bottle opener add convenience and versatility to the grinder.

Figure 25:
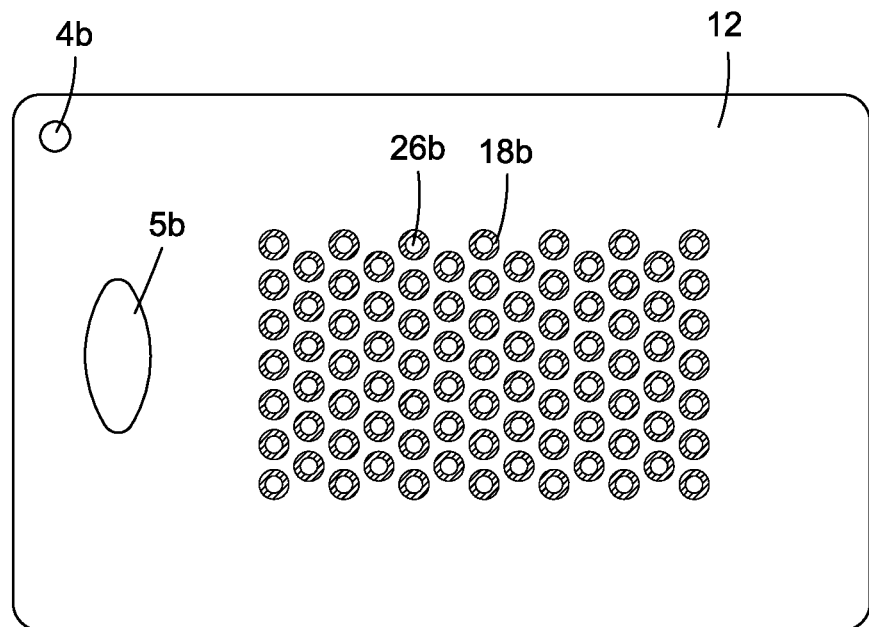
FIG. 25 is a plan view of another embodiment of the invention.

The alternative embodiment shown in FIG. 25, is similar to the grinder shown in FIG. 24, but with the addition of through holes 26b within the circular grooves 18b. The diameters of the holes 26b are preferably smaller than the diameters of the circular grooves, so that each hole is surrounded by an individual groove. The holes 26b have the same function as the holes in the embodiment of FIG. 23. However, in this particular embodiment, the holes are only formed in the grooves and are not distributed on the surfaces of the sheet.

The grooves can take on different shapes other than those shown in FIGS. 20-25, such as triangles, ovals, stars, polygons, and can also be hearts or even other irregular shapes, and combinations thereof. The size and shape of the grooves also can differ from groove to groove, and the grooves can be evenly or unevenly aligned.

Figure 26:
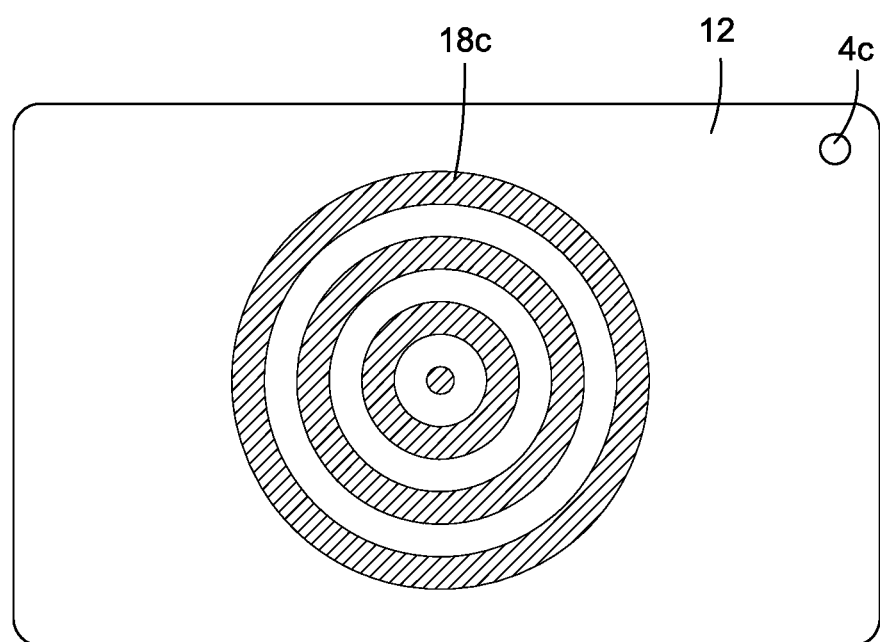
FIG. 26 is a plan view of yet another embodiment of the invention.

In the alternative embodiment shown in FIG. 26, the grooves 18c are formed as a series of concentric rings spaced apart at specific radial intervals. The sidewalls of the ring-like grooves 18c are not straight lines in the grinding area. Instead they form an arc, and this has the effect of pushing material being ground inward when grinding. This makes it much easier to crush and grind the material, and more efficient than if the sidewalls of the grooves were straight.

Figure 27:
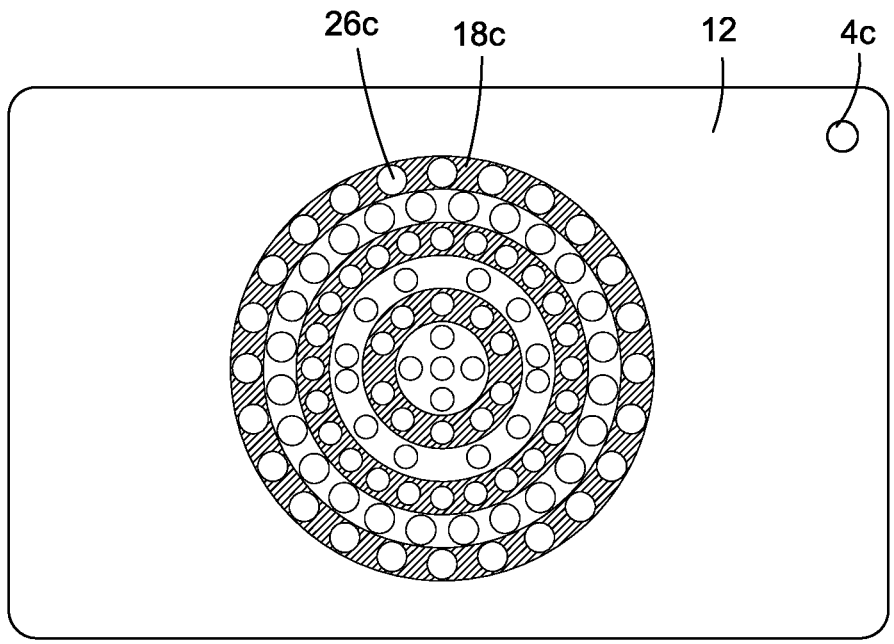
FIG. 27 is a plan view of still another embodiment of the invention.

FIG. 27 shows an alternative embodiment similar to FIG. 26, the difference being that there are through holes 26c distributed both in the grooves 18c and on the adjacent surfaces of the sheet 12. The holes 26c vary in size and spacing in different regions of the grinding area. Some regions have larger holes, while others have smaller holes. There are higher concentrations of holes in some regions and lower concentrations of holes in other regions. The holes 26c have the same function as the holes in the previous embodiments.

Figure 28:
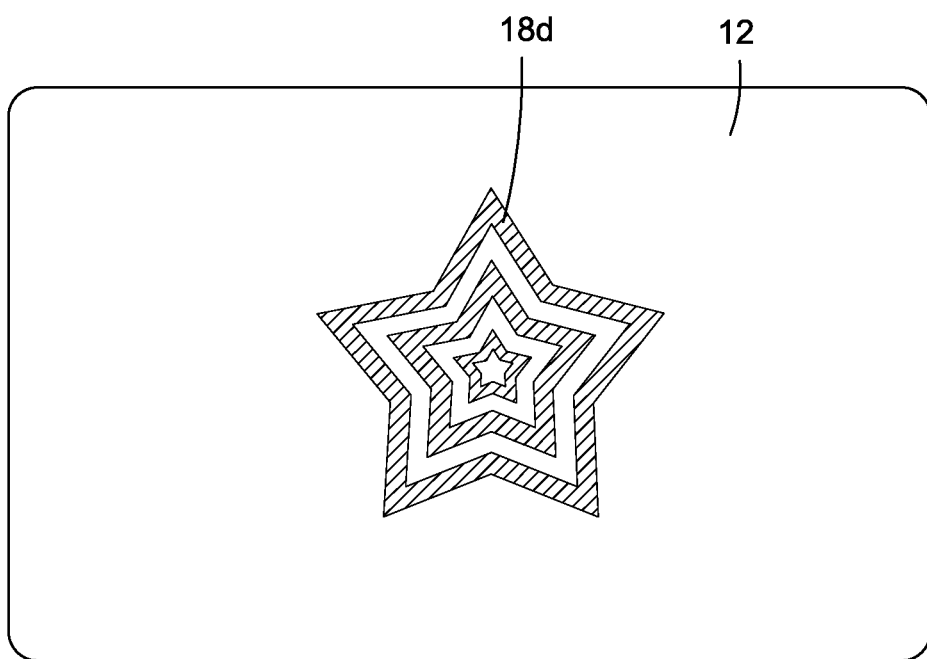
FIG. 28 is a plan view of another embodiment of the invention.

The embodiment shown in FIG. 28 is similar to the embodiment shown in FIG. 26, except that the grooves 18d form concentric star shaped patterns which are distributed at specific radial intervals.

Figure 29:
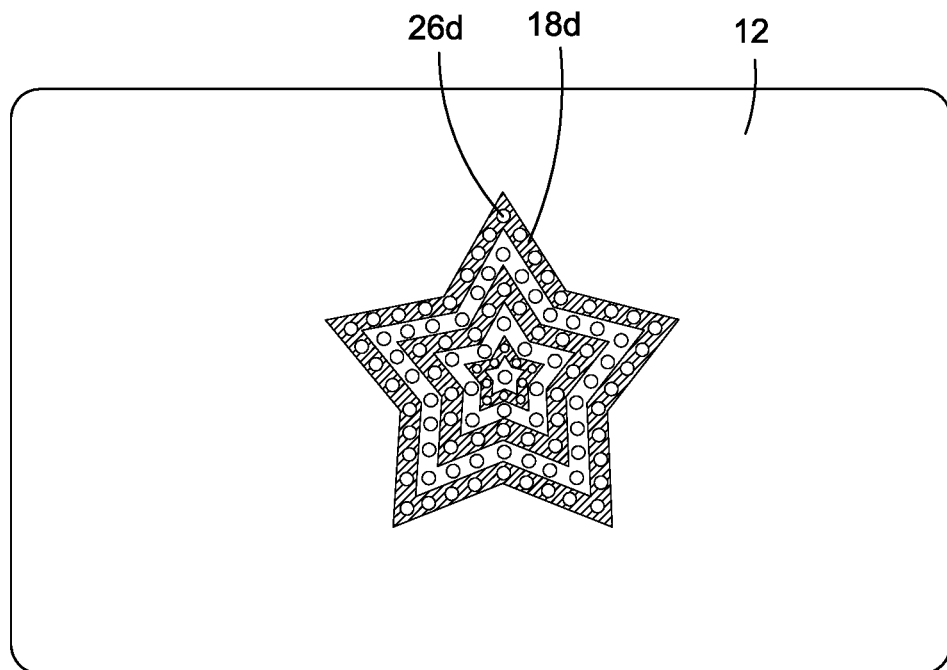
FIG. 29 is a plan view of still another embodiment of the invention.

The embodiment shown in FIG. 29 is similar to the embodiment shown in FIG. 28, but with through holes similar to the holes in FIG. 27. Like the embodiment shown in FIG. 27, the through holes 26d are again distributed both in the grooves 18d and on the adjacent surfaces of the sheet 12. And, similar to FIG. 27, the size and spacing of the holes 26d vary in different regions of the grinding area. The holes 26d have the same function as the holes in the previous embodiments.

In addition to stars, the grooved areas can take the shape of ovals, hearts, gems, and many other irregular shapes.

Figure 30:
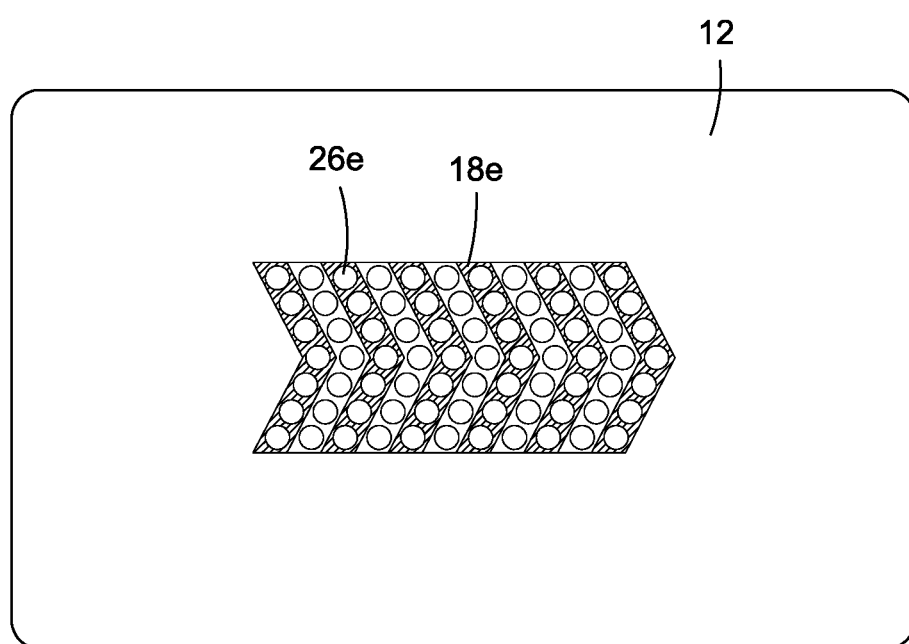
FIG. 30 is a plan view of yet another embodiment of the invention.

FIG. 30 shows an alternative embodiment in which the grooved areas 18e are V-shaped or arrowhead shaped and spaced apart at parallel intervals. Again, the grooved areas 18e and the sheet 12 form the grinding surface. Like the embodiment shown in FIG. 29 and previous embodiments, holes 26e are distributed both in the grooved areas and on the adjacent surfaces of sheet 12 in the spaces between the grooved areas. Like the previous embodiment of FIGS. 26 and 27, the angles between the sidewall segments which intersect to form the V-shape grooves also provides an inward pushing effect on the material being ground, resulting in easier crushing and grinding of the material.

Figure 31:
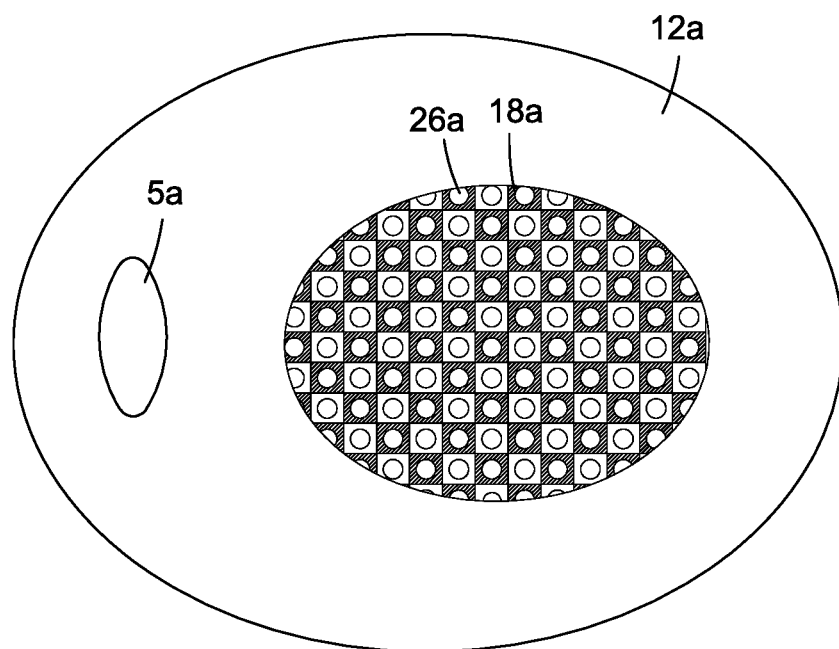
FIG. 31 is a plan view of another embodiment of the invention.

The embodiment shown in FIG. 31 is similar to the embodiment shown in FIG. 23, the difference being that both the shape of the sheet 12a and the shape of the grinding area is an oval. A bottle opener 5a also is provided. The bottle opener 5a also can be used as a hanging hole for the grinder, if desired.

Figure 32:
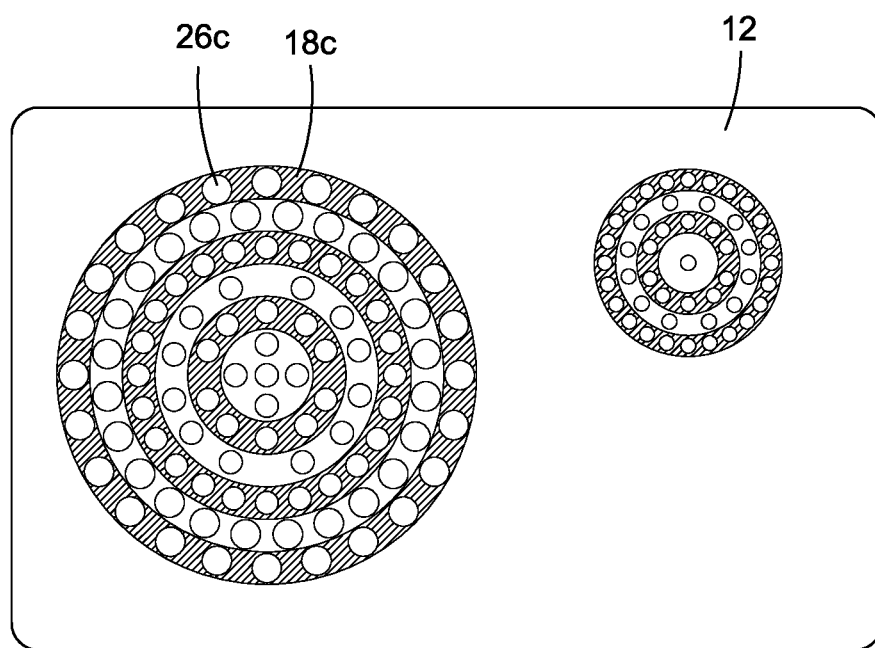
FIG. 32 is a plan view of yet another embodiment of the invention.

The embodiment shown in FIG. 32 has grinding areas similar to the ones shown in FIG. 27 except that there are two different grinding areas of two different sizes provided. These two grinding areas can be used for different functions. For example, one can be used as a rough grinding area while the other can be used as a fine grinding area. This provides different selections of grinding consistency within the same sheet.

Figure 33:
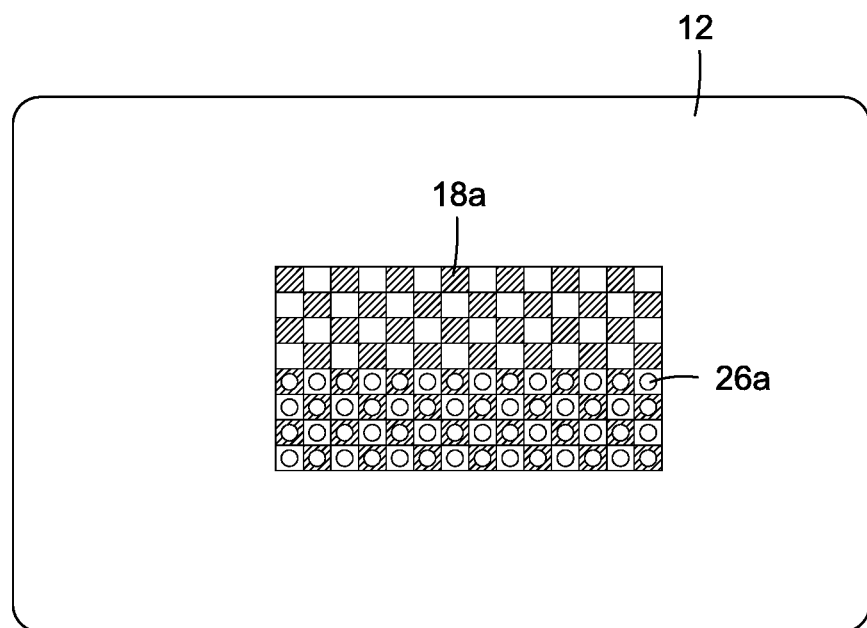
FIG. 33 is a plan view of still another embodiment of the invention.

FIG. 33 shows an alternate way of providing two different grinding areas on the same sheet. While the embodiment shown in FIG. 32 had two spatially separated grinding areas on the same sheet, the embodiment shown in FIG. 33 uses two different but adjacent grinding patterns within the same grinding area. The grinding patterns are a combination of the patterns shown in FIG. 22 and FIG. 23. The pattern without the through holes serves as a normal grinding area, while the pattern with the through holes serves as a more highly-efficient grinding zone.

In all of the embodiments mentioned above, the notches or grooves are generally (but not necessarily) rectangular in cross-sectional shape with sidewalls that are preferably but not necessarily perpendicular to the flat surface of the sheet. The angle between the sidewall and the flat surface of the sheet can be either acute or obtuse. When the angle is acute, the grinding edge protrudes more. The cutting effect is enhanced, and the grinding effect is reduced. When the angle is obtuse, the cutting edge is more blunt. As a result, the grinding effect is enhanced, while the cutting effect is reduced.

In order to prevent the ground bits from adhering to the surface of the grinder and thereby reducing the effectiveness and service life of the grinder, and in order to make it easier to clean the grinder after each use, the grinder may be coated with a non-stick material on the surface of the sheet, such as Teflon, so that the grinder can be easily washed and quickly cleaned. A frosted or brushed finish also may be applied to the surface of the grinder, if desired.

In all of the foregoing embodiments, the sheet can be made out of plastic, metal, wood or glass, and combinations thereof. The thickness of the sheet is preferably between about 0.15 mm and 5 mm. When the grinder includes the bottle opener option, the sheet material normally needs to be a little thicker. The depth of the notches or grooves is preferably between 0.005-2 mm. A shallow depth notch or groove generally results in a grinder which can grind to a more fine texture. The size of the holes is preferably between about 0.5 mm and 15 mm, with 4 mm being typical.

In all of the foregoing embodiments, the shape of the sheet is preferably flat, but if desired, the sheet may also be bent or curved. When it is curved in a concave manner, the sheet can be placed on a surface and the ground bits can be allowed to fall under the sheet, which is useful when grinding large amount of materials, without the need to move the grinder.

It will be appreciated that each of the grinders described above may be used individually to grind a herb, or they may be used in pairs for a dual grinding action. When used in pairs, it is desirable that both grinders be identical and have the grinding area disposed along a longitudinal edge of the card with a series of horizontal grooves extending away from the edge. In use, the user holds one grinder in each hand, and with a back and forth motion, grinds herb placed between the two grinders. This dual grinding action is particularly useful for quickly grinding large amounts of herb without touching the herb with one's fingers.

The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:
1. A herb grinder comprising:
a metal sheet having a first surface and second surface opposite the first surface;
a plurality of circular holes in the sheet extending between the first surface and the second surface and arranged in a pattern to form a grinding area;

wherein each hole has a first radius at the first surface, and a second radius at the second surface;

wherein the first radius is larger than the second radius;

wherein each hole is defined by a conical surface on the inside of the hole; and wherein at least some of said holes have a roughened texture on the conical surface.

2. The herb grinder of claim 1, wherein the conical surface on at least some of said holes is curved towards the first and second surfaces.

3. The herb grinder of claim 1, wherein the first surface has a reduced height region between adjacent holes.

4. The herb grinder of claim 3, wherein the reduced height region of the first surface forms a narrow edge between the adjacent holes.

5. The herb grinder of claim 1, wherein the holes are aligned in relation to each other to form rows.

6. The herb grinder of claim 5, wherein the rows extend diagonally across the grinding area.

* * * * *